No. 624,422. Patented May 2, 1899.
J. P. BAIRD.
CUT-OFF DEVICE FOR VEHICLE WASHING HOSE.
(Application filed Feb. 2, 1898.)
(No Model.)
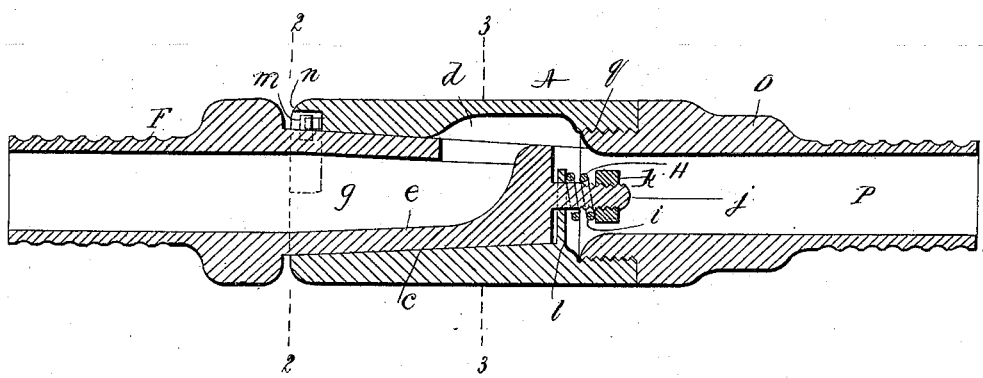
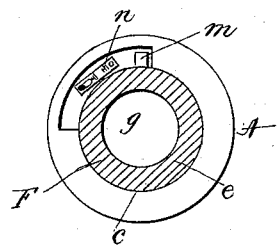 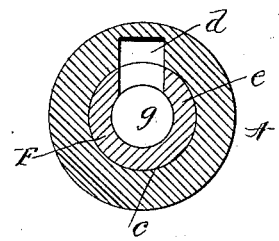
WITNESSES: INVENTOR
John P. Baird,
BY
Edgar Tate & Co.
ATTORNEYS

UNITED STATES PATENT OFFICE.

JOHN P. BAIRD, OF NEW YORK, N. Y.

CUT-OFF DEVICE FOR VEHICLE-WASHING HOSE.

SPECIFICATION forming part of Letters Patent No. 624,422, dated May 2, 1899.

Application filed February 2, 1898. Serial No. 668,858. (No model.)

*To all whom it may concern:*

Be it known that I, JOHN P. BAIRD, a citizen of the United States, residing at New York, in the county of New York and State of New York, have invented certain new and useful Improvements in Cut-Off Devices for Vehicle-Washing Hose, of which the following is a full and complete specification, such as will enable those skilled in the art to which it appertains to make and use the same.

This invention relates to vehicle-washing apparatus; and it has for its object to provide a simple and improved cut-off device for the hose by which the flow of water can be conveniently controlled without operating the main shut-off cock.

Ordinarily in vehicle-washing apparatus a length of hose extends from a suitable feed-pipe having a shut-off cock, and the flow of water is entirely controlled by the shut-off cock at the feed-pipe, it being impracticable to have ordinary nozzle or other flow-governing devices at the end of the hose owing to the liability of scratching or damage to the vehicles. Therefore when the hose is dropped for a few moments or is temporarily out of use the water is generally permitted to run, the trouble of walking to the shut-off cock in the feed-pipe being avoided.

My invention is designed to provide shut-off devices in the hose by means of which the flow of water may be conveniently controlled while the vehicle-washing hose is in the hands of the operator and which will also in its general construction and exterior conformation obviate liability of scratching or damage to the vehicles.

The invention is fully disclosed in the following specification, of which the accompanying drawings form a part, in which the separate parts of my improvement are designated by the same letters of reference in each of the views, and in which—

Figure 1 is a longitudinal sectional view of a vehicle-washing-hose cut-off device embodying my improvements. Fig. 2 is a transverse sectional view taken on the line 2 2, Fig. 1. Fig. 3 is a transverse sectional view taken on the line 3 3, Fig. 1.

In the practice of my invention I provide a coupling device by means of which separate sections of hose may be connected, said coupling device consisting of three separate parts, and referring to the drawings, A designates the central part of my coupling device, said part being tubular and cylindrical in form, and one of the hose-sections is shown at B in Fig. 4. The coupling-piece A is provided with a conical bore $c$, and communicating therewith is a laterally and longitudinally extending channel or passage $d$, and said coupling-piece is employed in connection with two tubular end pieces F and O.

The part or piece F is provided with a conical end $e$, which fits in the bore $c$ of the part A and is provided with a central bore or channel $g$, adapted to register with and open laterally into the channel or passage $d$ in the central part A, and this channel or passage $d$ communicates with the central bore $p$ of the part or section O.

The coupling-piece A is carried by or connected with the tubular piece or section O by means of a screw-thread or in any desired manner, and the device thus comprises a coupling consisting of three parts or sections by means of which the separate sections of a hose may be connected, said coupling also forming a cut-off by which the water-flow may be controlled.

To provide for holding the conical end plug of the part or section F tightly on its conical seat in the coupling-piece A and for taking up any wear, I form a spring-actuated connection, as at H. In the construction shown in the drawings this spring-actuated connection is formed by a coiled spring $i$, mounted upon the stem or bolt J, formed on or secured to the plug $e$ and which passes through a partition $l$, arranged vertically or transversely of the central part A, and the spring $i$ is mounted on said stem or bolt between the partition $l$ and the nut $k$, mounted on the end of the pin or bolt.

It will be understood that when the coupling-piece A and plug $e$ are relatively turned, which operation can be performed by a simple twisting movement of the hose, the bore $g$ will register with the channel $d$ to cause the desired flow of water through the cut-off device, or the bore $g$ can be thrown out of register with the channel $d$ to cut off the flow of water. To limit this relative movement of the part A and the plug $e$, the latter is provided with a laterally-projecting pin or stud $m$, which enters and is adapted to move in a segmental groove or recess $n$ in the end of the coupling-piece A, the ends of this groove or recess being respectively engaged by the pin or stud to limit the relative turning movement of the parts.

The hose may be connected with the respective end pieces or sections F and O of the cut-off device in any suitable manner, and in the construction shown in Fig. 1 this connection for the hose-sections consists of threads or annular corrugations formed on said end pieces or sections, as shown in Figs. 1 and 3, and this construction and arrangement provides for the convenient separation of parts for purposes of substitution, cleansing, of repair.

The exterior surface of the members of the cut-off device is preferably smooth and cylindrical, as shown, so that it presents no projections or points which are liable to scratch or damage the vehicles. This non-liability to scratch or damage the vehicle and the convenient cut off of the water in the vehicle-washing hose is provided for by my improved general construction and arrangement, whereby the cut-off device is intermediately mounted between two hose-sections at a convenient point for manipulation by the operator while using the hose. The members of the cut-off device are relatively arranged, so that their exterior surfaces conjointly present a continuous smooth cylindrical joint between the hose-sections.

Having fully described my invention, I claim as new and desire to secure by Letters Patent—

A coupling device and cut-off for hose, comprising two tubular end parts or sections and a central tubular casing secured to one of said end parts or sections, said end parts or sections being adapted to form connections for the separate sections of the hose and the inner end of one of said parts or sections being slightly conical to form a plug, provided with a side port or passage, the central bore of the central part or section being also slightly conical in form, said central part or section being provided with a lateral longitudinal passage which forms a communication between said end parts or sections, and said plug being adapted to be turned in said central part or section, said central part or section being also provided with a transverse plate, and said plug with a pin which projects therethrough, a spring mounted on said pin and adapted to bear on said plate and on a nut mounted on the end of said pin, substantially as shown and described.

In testimony that I claim the foregoing as my invention I have signed my name, in presence of the subscribing witnesses, this 29th day of January, 1898.

JOHN P. BAIRD.

Witnesses:
L. M. MULLER,
M. A. KNOWLES.